July 21, 1936.  E. PUTTER  2,048,219
BOTTLE CLOSURE
Filed June 8, 1935
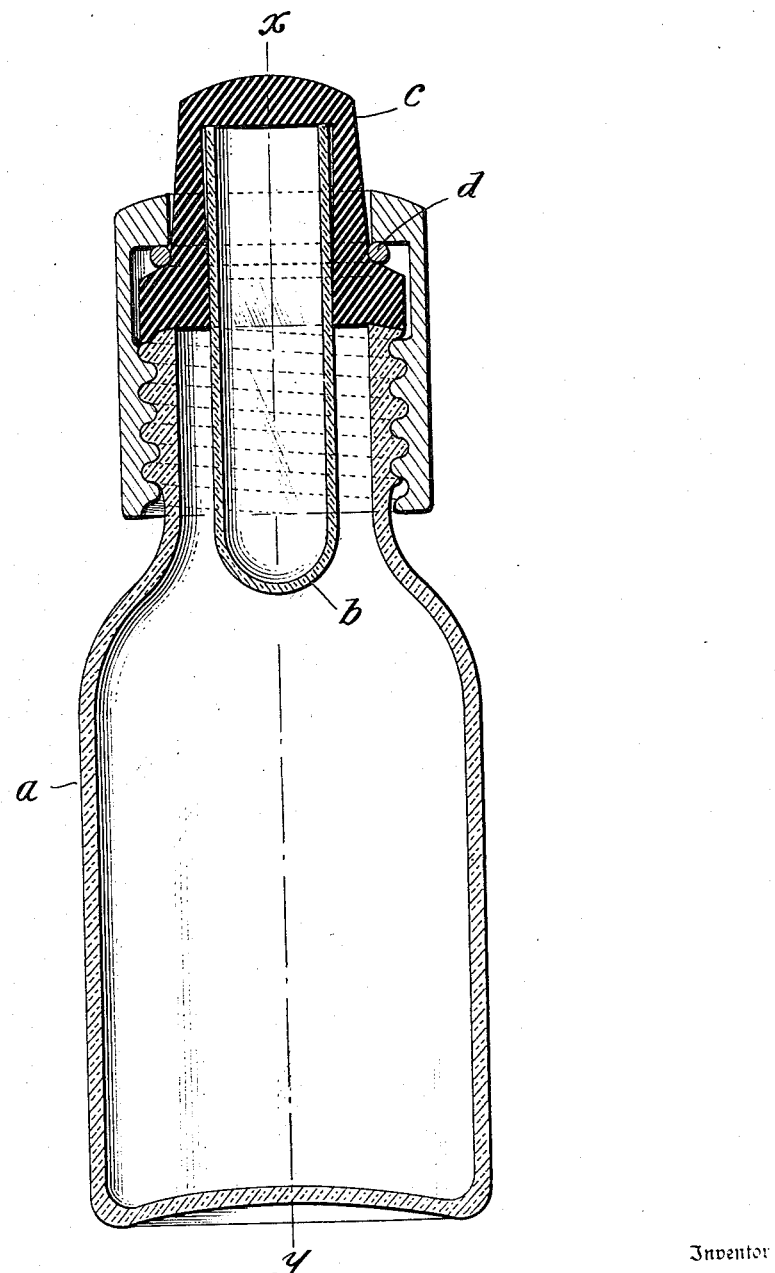
Inventor
ERICH PUTTER,
Attorney Patented July 21, 1936

2,048,219

UNITED STATES PATENT OFFICE 2,048,219

BOTTLE CLOSURE

Erich Putter, Berlin-Charlottenburg, Germany, assignor to Schering-Kahlbaum A. G., Berlin, Germany, a corporation of Germany Application June 8, 1935, Serial No. 25,673
In Germany June 6, 1934

10 Claims. (Cl. 215—6)

This invention relates to improvements in the construction of containers, such as bottles, adapted to retain two ingredients of a product in separate compartments until the product is to be used, and concerns more particularly a new closure for said containers.

There are already known various devices adapted to inclose in a single container separately from each other a dry powder and a solvent required for dissolving the powder, said devices allowing the desired solution to be made up in a simple manner shortly before use. The so-called double ampoules are the most frequently used devices of this type, but they are disadvantageous in so far as one can not take out therefrom any desired portions of their contents without removing the closure and thus exposing the contents of the ampoules to the air, which allows contamination of said contents.

Furthermore bottle closures are known allowing only fixed amounts of the contents to be taken out of the bottle by means of a syringe which is introduced through a little rubber cap. The characteristic feature of these closures consists in providing a suitably formed rubber cap which with its cylindrical part tightly surrounds a little tube thereby preventing its contents from being brought into contact with the liquid within the bottle. However, as experience has shown this kind of closure also has its disadvantages which are as follows:

(1) A reliable closure of the little tube containing the dry powder is not assured due to the fact that it is extremely difficult to prepare a sufficiently elastic and durable rubber.

(2) The manufacture of the rubber cap involves various difficulties so that uniformity in the quality of the pieces is not assured.

In contrast hereto the present invention is directed to a closure for bottles the rubber part of which is kept as small as possible, whereby at the same time the tightening is not left to the elasticity of the rubber alone but is supplemented by a concentric pressure upon the little glass tube containing the powder.

A mode of carrying out the invention is shown by way of example in the accompanying drawing:

A container $a$ having a circular neck and a screw thread on its upper portion is closed by a threaded cap $e$, preferably made of pressed material or of metal. The top of this cap is provided with an opening through which the upper part of a rubber cap $c$ is passed. The walls of said rubber cap preferably show a thickness which increases towards its opening. In the inner hole of the rubber cap there is placed a little tube $b$ made of glass or any other material to keep the dry powder. On screwing on the threaded cap $e$ tightly the flange of the rubber cap $c$ is pressed concentrically against the tube containing the powder thereby tightening it reliably toward the liquid within the container $a$. Preferably a metal ring $d$ is placed upon the outside flange of the rubber cap $c$ which permits a considerable pressure to be applied to the latter on screwing on the threaded cap and which prevents the threaded cap $e$ from sliding along the sloping flange of the rubber cap $c$ thereby distorting the same. If the cap $e$ of said closure device is loosened to a certain degree the pressure of cap $c$ on tube $b$ is fully released and the little tube $b$ falls into the container $a$ either by itself or on knocking the container on the table or on tapping the rubber cap $c$.

By these means the threaded cap $e$ does not only serve for closing the container but also to achieve proper tightening so as to prevent the powder from coming into contact with the dissolving liquid prematurely. A further very important advantage of the present invention is the fact that these bottles can be stored for a long period of time and shipped without any danger to the ingredients contained therein.

Of course, the closure described may not only be used for bottles but also for other containers and further changes and variations in the construction of the device described may be made by those skilled in the art in accordance with the principles set forth herein and in the claims annexed hereto.

What I claim is:

1. A container having a screw threaded neck, a threaded cap cooperating with the threads of the neck, said cap carrying a rubber cap having an outside flange adapted to fit over the end of the neck and form a tight seal therewith, a little tube adapted to carry a dry powder, which rubber cap on screwing the threaded cap on the container tightly surrounds said little tube so as to prevent a liquid present within the container from coming into contact with the inside of the tube, said rubber cap being constructed in such a manner that on screwing the threaded cap on the container a gradually increasing concentric pressure is exercised on the tube by the interior of the rubber cap, thereby shutting off the inside of the tube, whereas on loosening the threaded cap the tube adapted to carry the dry powder can easily slide out of the rubber cap, a metal ring being placed on the outside flange of the rubber cap said metal ring permitting said threaded cap to exert a considerable pressure upon said flange thus preventing the threaded cap from gliding on the rubber cap and distorting the latter.

2. A container comprising a neck portion, a hollow closure member of resilient material on said neck, a rigid cap surrounding said member and adapted to be locked onto said neck, a tube within said member, the size of said hollow portion being sufficiently larger than said tube so as not to grip the same, said cap being so formed as to compress said member inwardly and cause the same to grip said tube by friction when said cap is locked on said neck.

3. A container comprising a neck portion, a hollow socket member of resilient material on said neck, a rigid cap surrounding said member and adapted to be locked onto said neck, a tube within said member, the size of said hollow portion being sufficiently larger than said tube so as not to grip the same, said cap being so formed as to compress said member inwardly and cause the same to grip said tube by friction when said cap is locked on said neck.

4. A container comprising a neck portion, a hollow closure member of resilient material on said neck, a rigid cap having a central opening surrounding said member and adapted to be locked onto said neck, a tube within said member, the size of said hollow portion being sufficiently larger than said tube so as not to grip the same, said cap being so formed as to compress said member inwardly and cause the same to grip said tube by friction when said cap is locked on said neck.

5. A container comprising a neck portion, a hollow closure member of resilient material on said neck, a rigid cap surrounding said member and adapted to be locked onto said neck, a tube within said member, the size of said hollow portion being sufficiently larger than said tube so as not to grip the same, said cap being so formed as to compress said member inwardly and cause the same to grip said tube by friction when said cap is locked on said neck, the upper portion of said member extending upwardly through said opening.

6. A container comprising a neck portion, a hollow closure member of resilient material on said neck, a rigid cap surrounding said member and adapted to be locked onto said neck, a tube within said member, the size of said hollow portion being sufficiently larger than said tube so as not to grip the same, said cap being so formed as to compress said member inwardly and cause the same to grip said tube by friction when said cap is locked on said neck, the upper portion of said member extending upwardly through said opening, the thickness of the walls of said member decreasing towards the top thereof.

7. A container comprising a neck portion, a hollow closure member of resilient material on said neck, a rigid cap surrounding said member and adapted to be locked onto said neck, a tube within said member, the size of said hollow portion being sufficiently larger than said tube so as not to grip the same, said cap being so formed as to compress said member inwardly and cause the same to grip said tube by friction when said cap is locked on said neck, and a ring interposed at the line of contact between said cap and member.

8. A container comprising a neck portion, a hollow closure member of resilient material on said neck, a rigid cap surrounding said member and adapted to be locked onto said neck, a tube within said member, the size of said hollow portion being sufficiently larger than said tube so as not to grip the same, said cap being so formed as to compress said member inwardly and cause the same to grip said tube by friction when said cap is locked on said neck, said member being of sufficient thinness to be pierceable by a needle.

9. A container comprising a neck portion, a hollow closure member of resilient material on said neck, a rigid cap surrounding said member and adapted to be locked onto said neck, a tube within said member, the size of said hollow portion being sufficiently larger than said tube so as not to grip the same, said cap being so formed as to compress said member inwardly and cause the same to grip said tube by friction when said cap is locked on said neck and to release said tube upon the release of said pressure by loosening said cap without removal thereof from said neck.

10. A container comprising a neck portion, a hollow closure member of resilient material on said neck, a rigid cap surrounding said member and adapted to be locked onto said neck, a tube within said member, the size of said hollow portion being sufficiently larger than said tube so as not to grip the same, said cap being so formed as to compress said member inwardly and cause the same to grip said tube by friction when said cap is locked on said neck, the outer face of said member being tapered outwardly relative to said cap.

ERICH PUTTER.